No. 853,981. PATENTED MAY 21, 1907.
G. M. KNEUPER.
FILTERING MATERIAL.
APPLICATION FILED MAY 29, 1906.

2 SHEETS—SHEET 1.

WITNESSES:
INVENTOR
George M. Kneuper
BY his ATTORNEYS

No. 853,981. PATENTED MAY 21, 1907.
G. M. KNEUPER.
FILTERING MATERIAL.
APPLICATION FILED MAY 29, 1906.
2 SHEETS—SHEET 2.
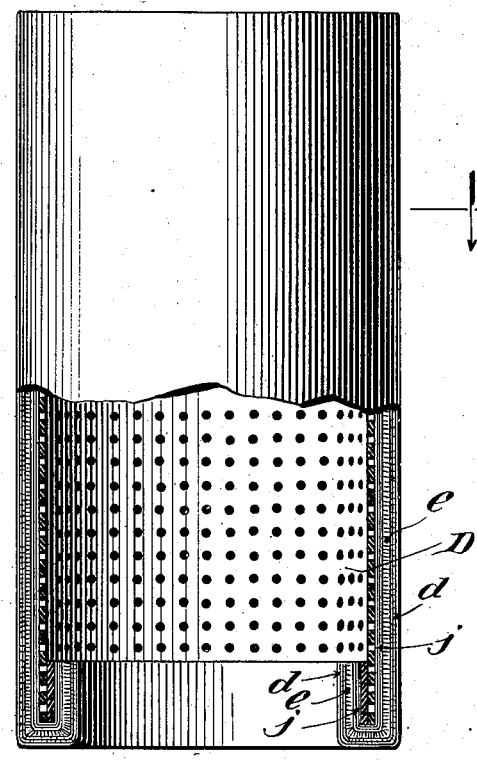
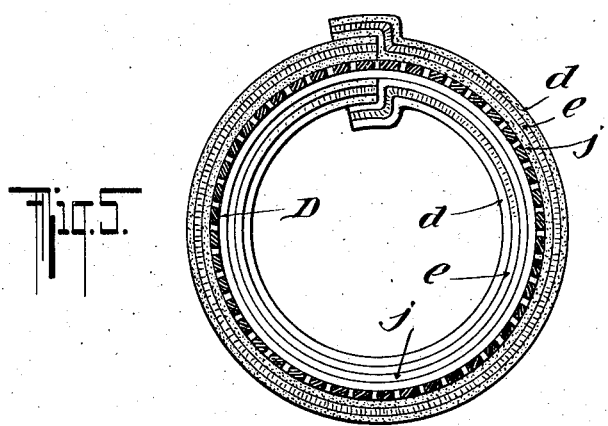
WITNESSES
INVENTOR
George M. Kneuper
BY
ATTORNEYS

UNITED STATES PATENT OFFICE.

GEORGE M. KNEUPER, OF NEW YORK, N. Y., ASSIGNOR OF ONE-THIRD TO GEORGE KNEUPER AND ONE-THIRD TO KATE KNEUPER.

FILTERING MATERIAL.

No. 853,981.   Specification of Letters Patent.   Patented May 21, 1907.

Application filed May 29, 1906. Serial No. 319,280.

*To all whom it may concern:*

Be it known that I, GEORGE M. KNEUPER, a citizen of the United States, and a resident of the borough of Brooklyn, county of Kings, city and State of New York, have invented certain new and useful Improvements in Filtering Material, of which the following is a specification.

This invention relates to a new filtering material which is intended to allow viscous and other liquid and semi-liquid matters to pass through it with reasonable speed.

Filters are usually made dependent upon the existence in the filtering bodies of channels or passages, but in most filtering bodies known to me these passages are not regulated in the process of manufacture and are frequently interrupted, being mere cavities in which the matter to be filtered is apt to lodge and from which it is almost impossible to dislodge it.

The object of my invention is to make a filter in which the passages for the material to be filtered are rendered continuous, and regulated so that they shall be continuous or practically so.

Figure 1:
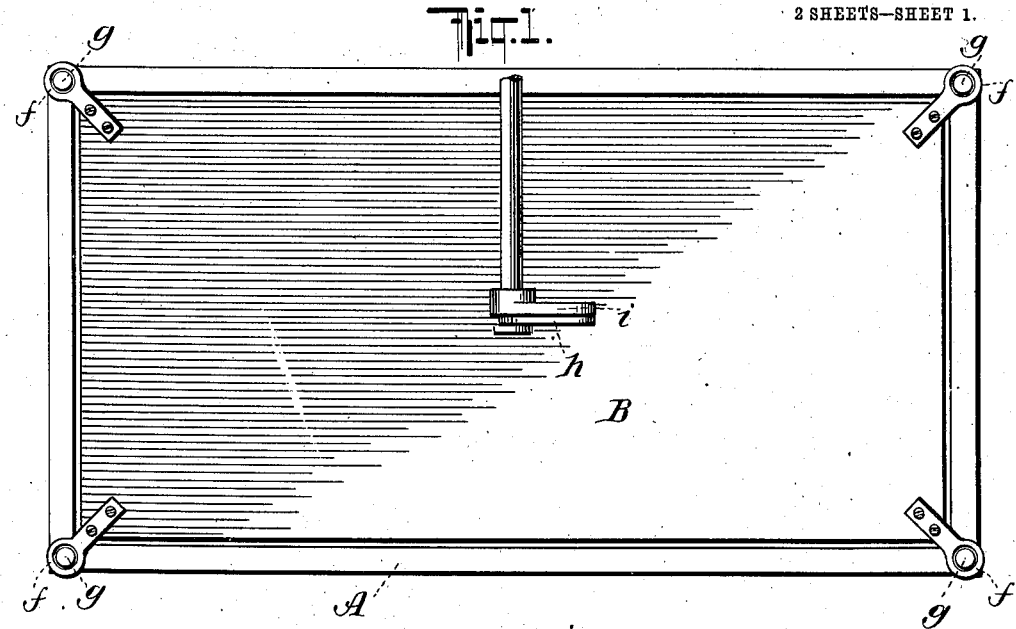
Figure 2:
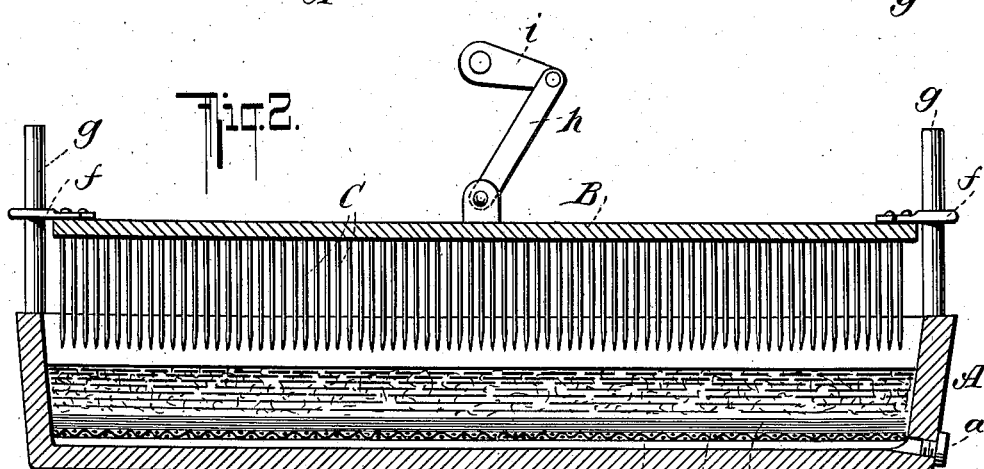
Figure 3:
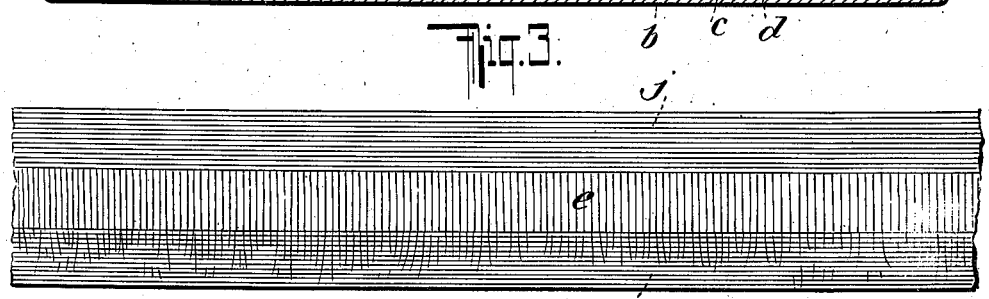

In making my improved filter I use an apparatus which is illustrated in the accompanying drawing, in which Figure 1 represents a top view of such apparatus; Fig. 2 a vertical central section thereof. Fig. 3 a vertical section on a very much enlarged scale of my improved filter. Fig. 4 is an elevation partly in section showing one way of using my improved filter and Fig. 5 is a sectional view thereof on line 5—5 of Fig. 4.

In making my improved filter the process is as follows: I take a vat A which is open on top and has an outlet opening at *a* near the bottom, and a plug for closing the same. Upon the bottom of this vat are arranged series of slats *b*, upon which I lay a wire screen *c*, so that water contained in the vat may get under this wire screen. Upon this wire screen *c* I then place a layer *d* of cotton, being a sheet of pure cellulose or cotton of that kind in which the fibers run parallel to each other. I then fill the tank nearly full of water and place in it an amount of cotton pulp or wood pulp, preferably the kind known as sulfite pulp, made from poplar wood, sufficient to make when collected, the intermediate layer *e* (see Fig. 3) of my filter. The pulp is suspended in the water contained in the tank and is evenly distributed therein. If I did nothing to this pulp but merely withdraw the water by opening the holes *a*, I would obtain an ordinary wood pulp filter with the pores irregularly distributed, many of them mere cavities without outlets, and many of them therefore useless for filtering purposes. But in order to obviate the creation of these incongruous passages, and to make the filter passages continuous and distribute them evenly, I use a needle-board B which is set at the lower side with close needles C or needle-like projections. The drawing (Fig. 2) shows of course only one row of such needles, but there are repeated rows, as many as the board will hold, according to the width of the tank A. In the alternating rows it is preferable that the needles break joints. Sixty-four needles to the square inch is an efficient number. The board B has suitable guide-loops *f* which embrace suitable stationary guide-posts *g*, and is connected by the rod *h* with a crank *i* or other suitable mechanism for rapidly moving the board B and the needles which it carries, up and down. In operation these needles are forced rapidly through the water and partly into the cotton layer *d*, carrying the pulp in the tank close to and partly into said layer. Each needle in descending, displaces some of the pulp, and as the descent is very rapid, and the reascent equally rapid, the pulp fibers will gradually be given an approximately vertical direction, thus extending about at a right angle to the fibers of the cotton layer *d*. As the fibers penetrate into the cotton layer (see Fig. 3), the two layers *d* and *e* will be firmly connected. The water is then allowed to run off, by opening the outlet *a*, and thereupon the needle-board is again reciprocated up and down, to more firmly drive the pulp fibers into the cotton layer and insure a more regular distribution and arrangement of the pulp fibers. When this operation has been carried on for a sufficient length of time, I put another layer of cotton *j* upon the intermediate layer *e*, having first removed the board B. This layer should be of the same kind as the layer *d*, that is, with the fibers all running in the same direction, and preferably parallel to those of the lower layer *d*. This brings the pulp body of the filter into position between the two cotton layers $d$ and $j$ (see Fig. 3) and results in the production of a filter in which the main body $e$ has transverse pores, all, or nearly all, of which are continuous.

With the aid of this filter I can operate on viscous liquids and the like, much more rapidly than with any other filter heretofore known. The filter body $e$ can be used for filtering and analogous purposes, if desired.

A sheet of filtering material made as above described can be used in any suitable manner, but I prefer to wrap it upon a perforated cylinder of metal or other stiff material D, as shown in Figs. 4 and 5, in substantially the same manner as disclosed in my Patent No. 796,519, dated August 8, 1905. Care should be taken however, to have the fibers of the sheets $d$ and $j$ run lengthwise of the cylinder, that is, transversely to the direction of the flow of the liquid, so that the fibers of the pulp layer $e$ will run substantially parallel to the direction in which the liquid passes through the filter.

It is to be understood that while I have shown the two edges of the filtering material as overlapping, this is not absolutely necessary as the two said edges might merely abut against each other.

What I claim is:

1. A filter composed of particles of pulp containing continuous transverse passages.

2. A filter composed of particles of pulp containing continuous transverse passages and a layer of cotton into which the pulp fibers penetrate.

3. A filter composed of particles of pulp containing continuous transverse passages and two layers of cotton between which said pulp particles are arranged.

4. A filtering sheet made of pulp and having the fibers extending transversely, that is, in a direction substantially perpendicular to the faces of the sheet.

5. A filtering sheet consisting of pulp, the fibers of which extend in a direction substantially perpendicular to the faces of the sheet, in combination with a filtering sheet into which the fibers of the first-named sheet penetrate.

6. A filtering sheet comprising a layer of pulp, the fibers of which extend substantially perpendicular to the surface of the sheet, and a layer of cellulose into which the fibers of said pulp layer penetrate, the fibers of the cellulose layer being all parallel with the surface of said layer.

7. A filtering sheet comprising a central layer of pulp, the fibers of which extend substantially perpendicular to the faces of the sheet, and two layers of cellulose between which said pulp layer is arranged.

8. A filtering sheet comprising a central layer of pulp, the fibers of which extend substantially perpendicular to the faces of the sheet, and two layers of cellulose between which said pulp layer is arranged, the fibers of said cellulose layers being parallel with each other and with the faces of the sheet, and the fibers of the pulp layer penetrating into one of the cellulose layers.

9. A filter comprising a tubular perforated support, and a filtering sheet carried by said support, and having fibers perpendicular to the face of said support.

10. A filter comprising a perforated support and a filter sheet carried thereby and comprising a layer the fibers of which are perpendicular to the face of said support, and another layer, the fibers of which run lengthwise of said support.

11. A filter comprising a perforated tubular support and a filtering sheet carried by said support, comprising a central layer of fibers, which are substantially perpendicular to said support, and two layers between which said first-named layer is inclosed, the fibers of said two layers running lengthwise of the support.

In testimony whereof, I have signed this specification in the presence of two subscribing witnesses.

GEORGE M. KNEUPER.

Witnesses:
JOHN LOTKA,
JOHN A. KEHLENBECK.